(12) United States Patent  (10) Patent No.: US 8,038,165 B2
Wang  (45) Date of Patent: Oct. 18, 2011

(54) DEVICE FOR ALLOWING A WHEELED VEHICLE FOR INDIVIDUALS TO BE DRAGGED IN A FOLDED CONFIGURATION

(76) Inventor: Arthur Wang, Kang Shan Town (TW)

( * ) Notice: Subject to any disclaimer, the term of this patent is extended or adjusted under 35 U.S.C. 154(b) by 466 days.

(21) Appl. No.: 12/285,540

(22) Filed: Oct. 8, 2008

(65) Prior Publication Data

US 2010/0084831 A1    Apr. 8, 2010

(51) Int. Cl.
    *B60R 21/00*    (2006.01)
(52) U.S. Cl. ............... 280/304.2; 280/650; 280/304.1; 280/642; 280/755; 180/65.1
(58) Field of Classification Search ............ 280/642, 280/650, 304.1, 304.2; 180/65.1, 907, 908
    See application file for complete search history.

(56) References Cited

U.S. PATENT DOCUMENTS 7,472,923 B2 *    1/2009    Wang .................... 280/767

* cited by examiner

*Primary Examiner* — J. Allen Shriver, II
*Assistant Examiner* — Erez Gurari
(74) *Attorney, Agent, or Firm* — Rosenberg, Klein & Lee (57) ABSTRACT

A foldable wheeled vehicle for individuals includes a main body, front and rear wheels joined on the body, and an anti-tip wheel joined on a rear end of the main vehicle body; the rear wheels will be in an immobilized state when the vehicle isn't in-use; the anti-tilting wheel will move to be below the rear wheels automatically when the vehicle is folded; thus, the vehicle in the folded position can be dragged with the front wheels and the anti-tip wheel contacting the ground; secondly, the anti-tip wheel will be in a higher position than the rear wheels when the vehicle is in an expanded in-use position; thus, when the vehicle is moving along a slope and tilting rearwards, the anti-tip wheel will contact the ground to prevent the vehicle from tilting rearwards excessively to overturn.

4 Claims, 8 Drawing Sheets

DEVICE FOR ALLOWING A WHEELED VEHICLE FOR INDIVIDUALS TO BE DRAGGED IN A FOLDED CONFIGURATION

BACKGROUND OF THE INVENTION

1. Field of the invention

The present invention relates to a foldable wheeled vehicle for individuals, more particularly one, which includes an anti-tip wheel; when the vehicle isn't in-use and folded, the rear wheels will be in an immobilized state and the anti-tip wheel will be below the rear wheels, thus allowing the folded vehicle to be easily dragged; when the vehicle is in an expanded in-use position, the anti-tip wheel will be higher than the rear wheels; therefore, when the vehicle is moving along a slope and tilting rearwards, the anti-tip wheel will contact the ground to prevent the vehicle from overturning.

2. Brief Description of the Prior Art

Various wheeled vehicles are available for use by the elderly and physically disabled persons, e.g. electric walk-substituting carts and electric wheelchairs.

A currently existing wheeled vehicle consists of a body, front and rear wheels, and an anti-tip wheel, which is joined on a rear end of the main vehicle body to prevent the vehicle from overturning when the vehicle is moving on a slope.

Most of the currently-existing wheeled vehicles can't be reduced or folded for easy transportation and storage. Therefore, such vehicles aren't convenient to use.

To overcome the above-mentioned problem, the industry developed a separable wheeled vehicle, which can be easily separated into several different mechanisms by the users. However, it still will take a considerable amount of time and labor to separate the vehicle. Therefore, such a wheeled vehicle isn't convenient to use, either.

SUMMARY OF THE INVENTION

It is an object of the present invention to provide an improvement on a wheeled vehicle for individuals to overcome the above problems. And, it is another object of the invention to provide an improvement on an anti-tip wheel of a wheeled vehicle, which can move automatically when the vehicle is being folded or expanded.

A wheeled vehicle for individuals in accordance with an embodiment of the present invention includes a main vehicle body, front and rear wheels, a seat, and an anti-tip wheel. The anti-tip wheel will be in a higher position than the rear wheels when the vehicle is in an expanded in-use position; thus, when the vehicle is moving along a slope and tilting rearwards, the anti-tip wheel will contact the ground to prevent the vehicle from tilting rearwards excessively to overturn.

The rear wheels will be in an immobilized state when the vehicle isn't in-use. And, the anti-tip wheel will move to be below the rear wheels automatically when the vehicle is folded; thus, the vehicle in the folded position can be dragged with the front wheels and the anti-tip wheel contacting the ground.

The seat includes a supporting member pivoted on the main vehicle body. The anti-tip wheel is joined on a supporting rod pivoted on the rear end of the main vehicle body. A co-moving mechanism is provided between the supporting member and the supporting rod to allow motion of the seat to cause motion of the supporting member as well as the anti-tip wheel; the co-moving mechanism includes a first toothed portion on the supporting member of the seat, and a second toothed portion on the supporting rod of the anti-tip wheel, and both toothed portions engage each other.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
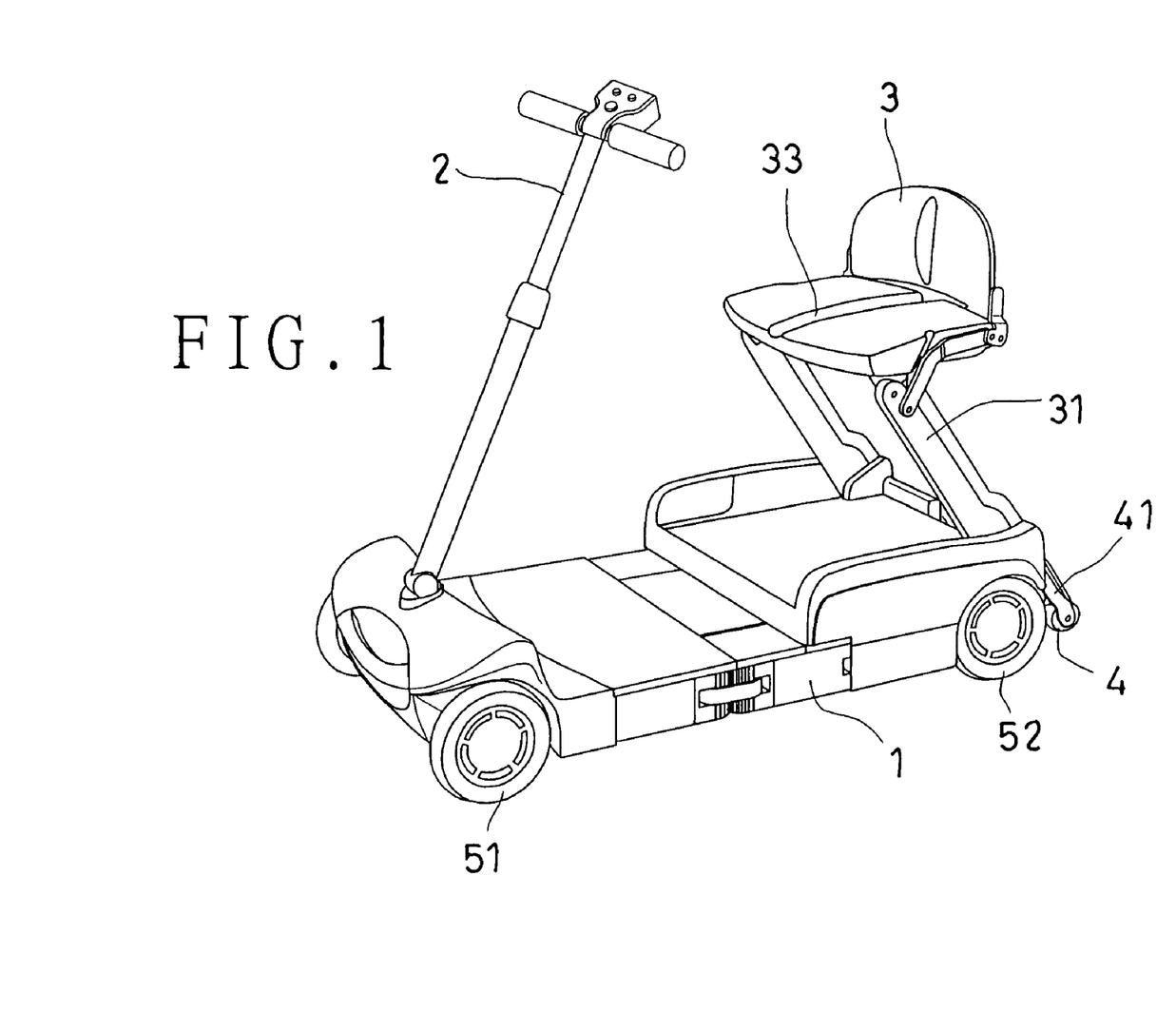
FIG. 1 is a perspective view of a wheeled vehicle for individuals in accordance with the present invention.
Figure 2:
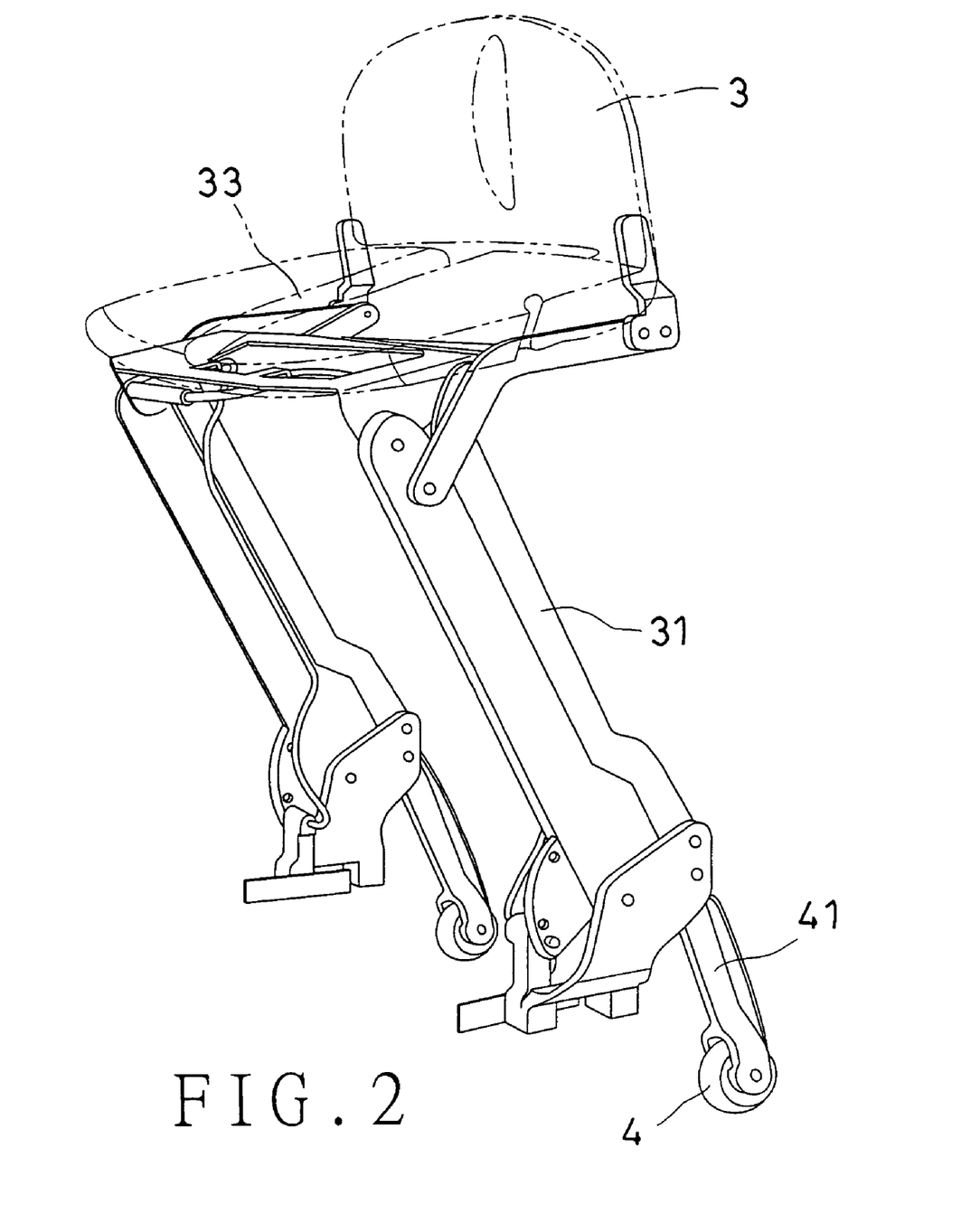
FIG. 2 is a partial perspective view of the wheeled vehicle for individuals.

Shown in FIG. 1 is a preferred embodiment of a foldable wheeled vehicle for individuals of the present invention, which consists of a main vehicle body 1, a steering mechanism 2, a seat 3, an anti-tip wheel 4, two front wheels 51, and two rear wheels 52.

Figure 8:
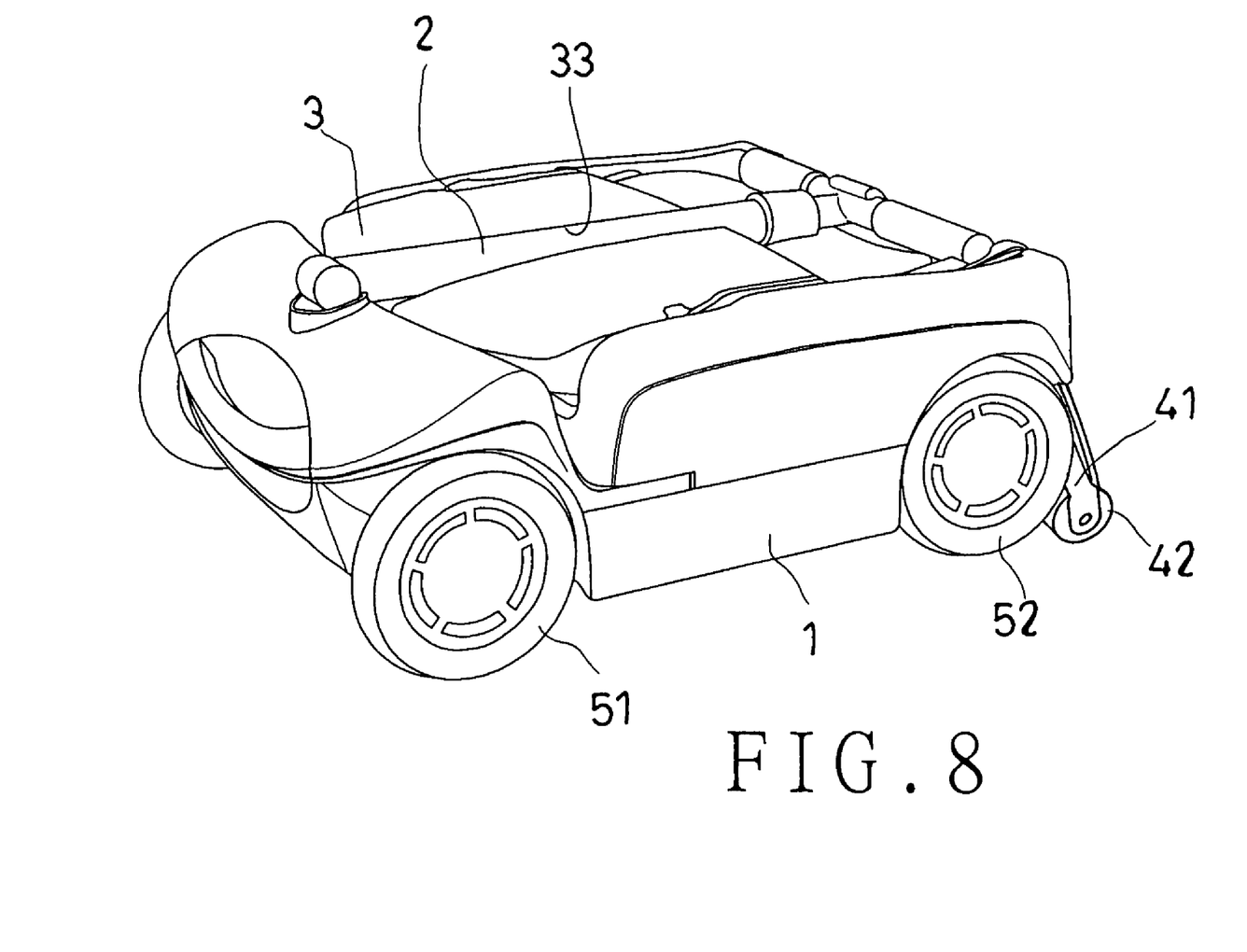
FIG. 8 is a perspective view of the wheeled vehicle for individuals in the folded position.

The front wheels 51 are joined on a front end of the main vehicle body 1, and the rear wheels 52 are joined on a rear end of the main vehicle body 1. The steering device 2 is pivoted on the front end of the main vehicle body 1. The seat 3 has a supporting member 31, which is pivoted on the main vehicle body 1. Moreover, the seat 3 has a holding recess portion 33, and the steering mechanism 2 will be received in the holding recess portion 33 of the seat 3 when the vehicle is in a folded not-in-use configuration, as shown in FIG. 8.

Figure 3:
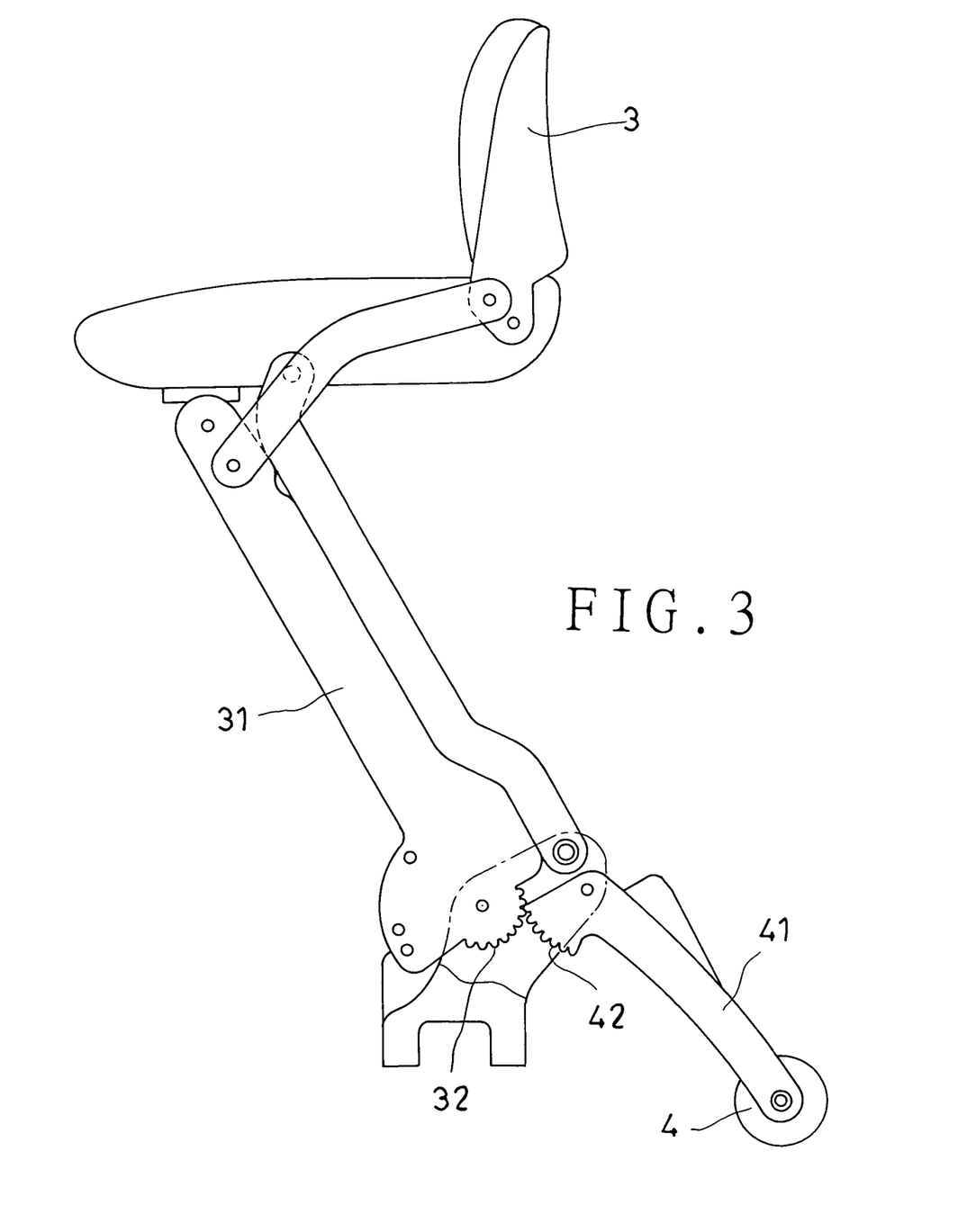
FIG. 3 is a partial sectional view of wheeled vehicle for individuals.

The anti-tip wheel 4 is supported with a supporting rod 41, which is pivoted on the rear end of the main vehicle body 1. The wheeled vehicle for individuals further includes a co-moving mechanism, which is provided between the supporting member 31 of the seat 3 and the supporting rod 41 of the anti-tip wheel 4 so as to allow motion of one of both the supporting rod 41 and the supporting member 31 to cause motion of the other one of the supporting rod 41 and the supporting member 31; referring to FIG. 3, the co-moving mechanism of the present embodiment includes a first toothed portion 32 formed on the supporting member 31 of the seat 3, and a second toothed portion 42 formed on the supporting rod 41 of the anti-tip wheel 4; the first and second toothed portions 32 and 42 are engaged with each other.

Figure 4:
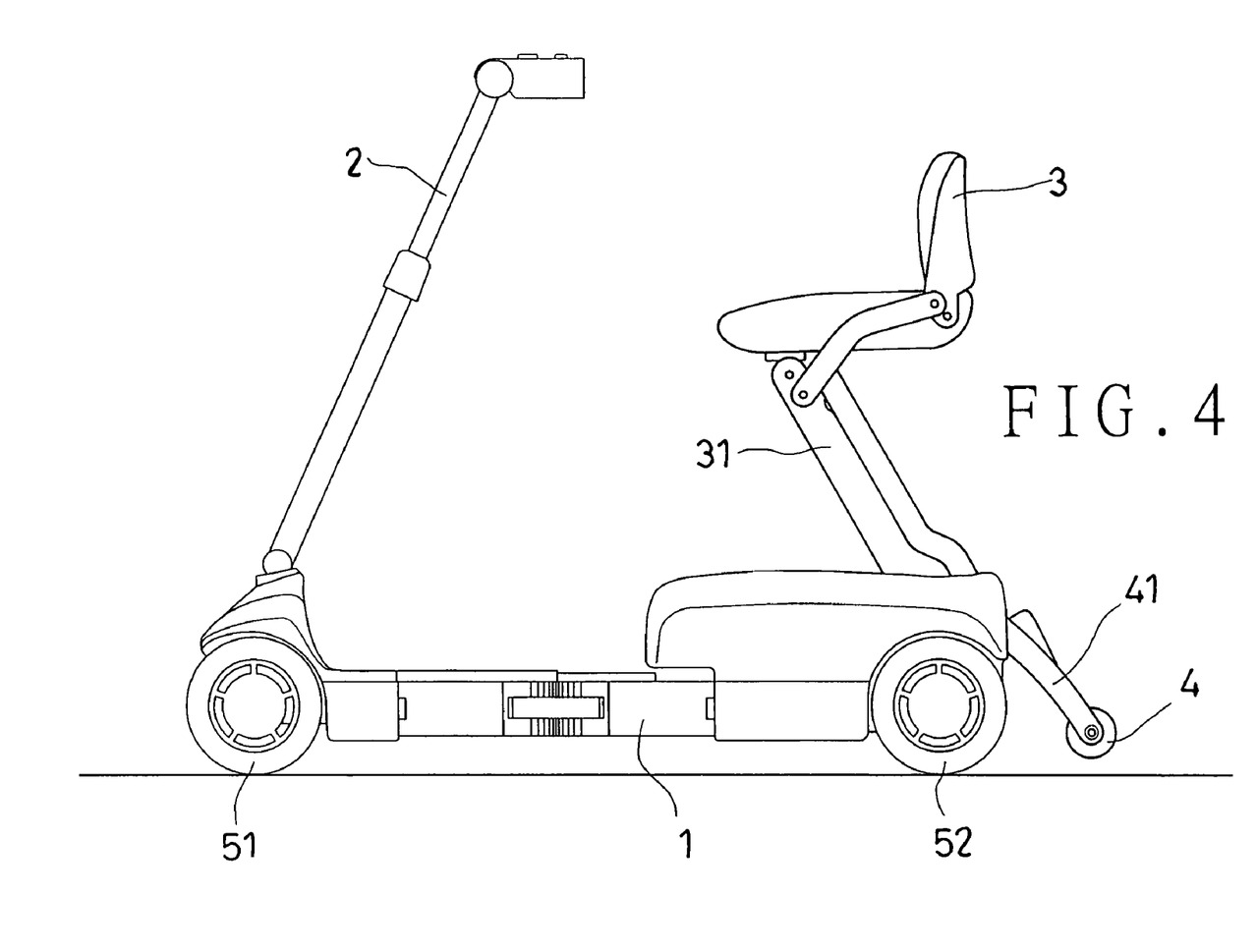
FIG. 4 is a side view of the wheeled vehicle for individuals in an expanded in-use position.

Referring to FIG. 4, a person can lift the seat 3, and pivot the steering mechanism 2 upwards so as to move the wheeled vehicle for individuals to an expanded usable position; when the seat 3 is being lifted, the supporting member 31 of the seat 3 will pivot upwards relative to the main vehicle body 1, and in turn the first toothed portion 32 of the supporting member 3 will cause pivotal motion of the supporting rod 41 of the anti-tip wheel 4. Finally, the anti-tip wheel 4 will rest in a higher position than the rear wheels 52. Therefore, when the wheeled vehicle for individuals is moving along a slope and tilting rearwards, the anti-tip wheel 4 will contact the ground to prevent the vehicle from tilting rearwards excessively to overturn.

Figure 5:
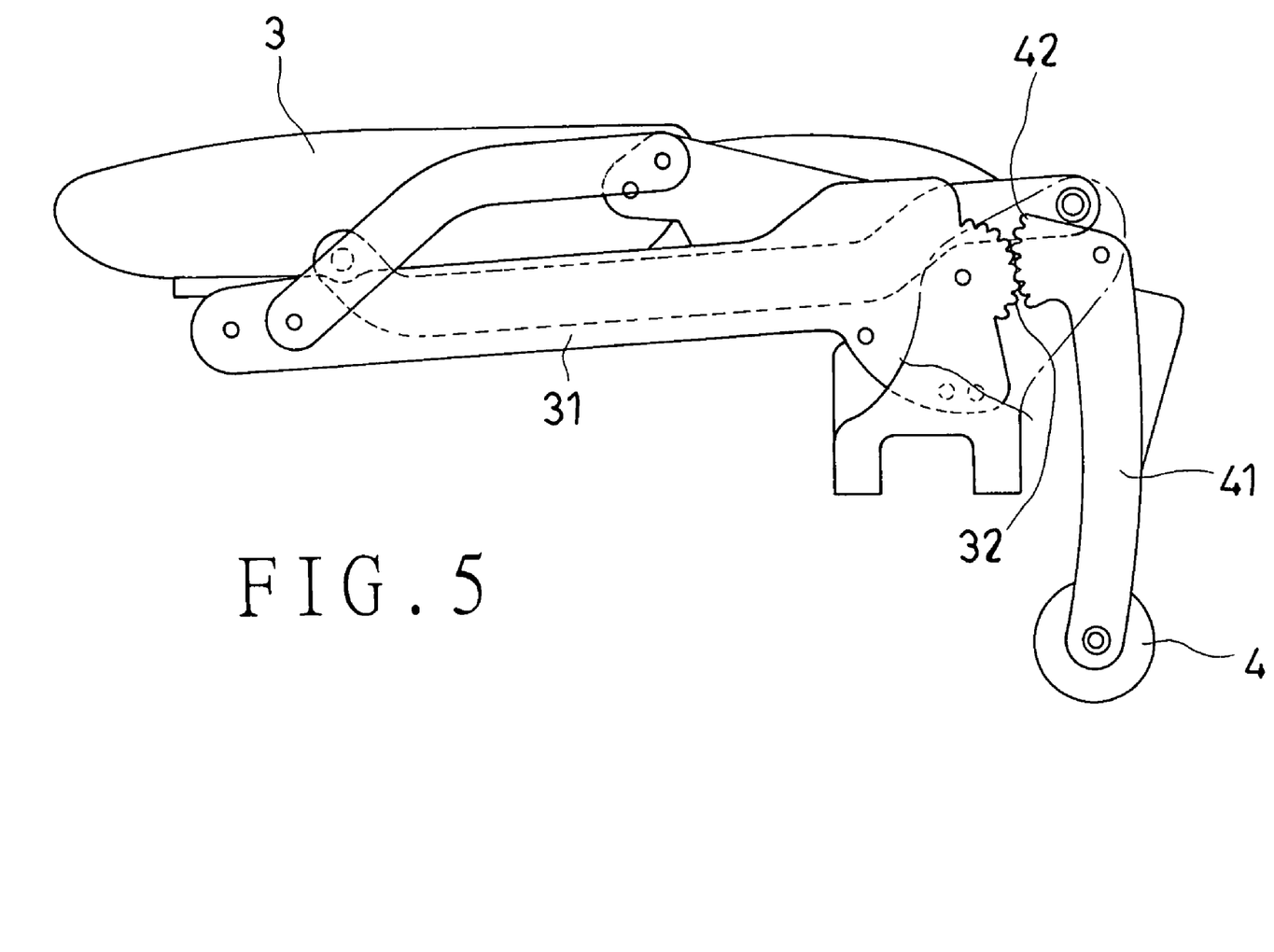
FIG. 5 is a partial sectional view of the wheeled vehicle for individuals in a folded position.
Figure 6:
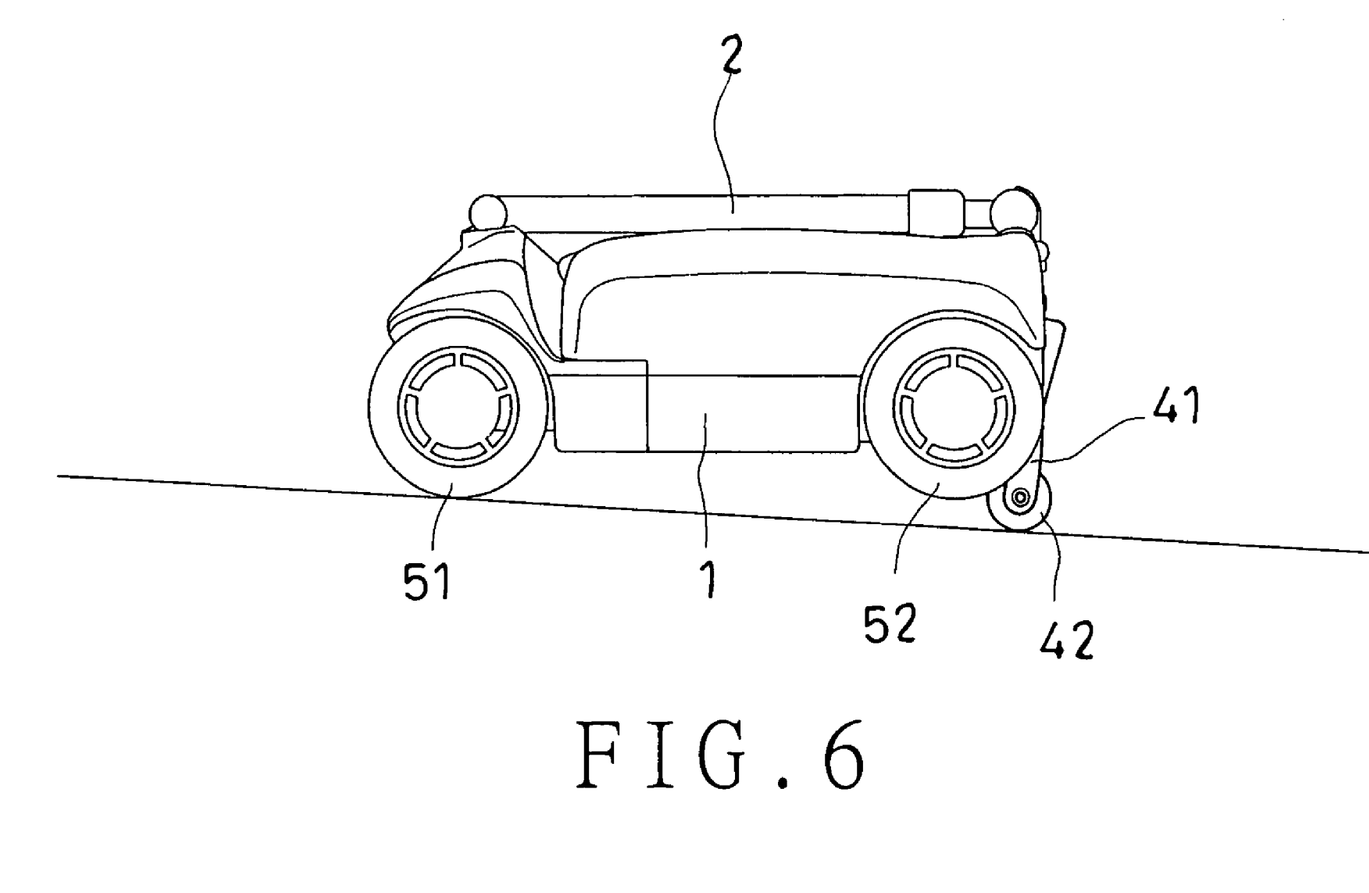
FIG. 6 is a side view of the wheeled vehicle for individuals in the folded position.
Figure 7:
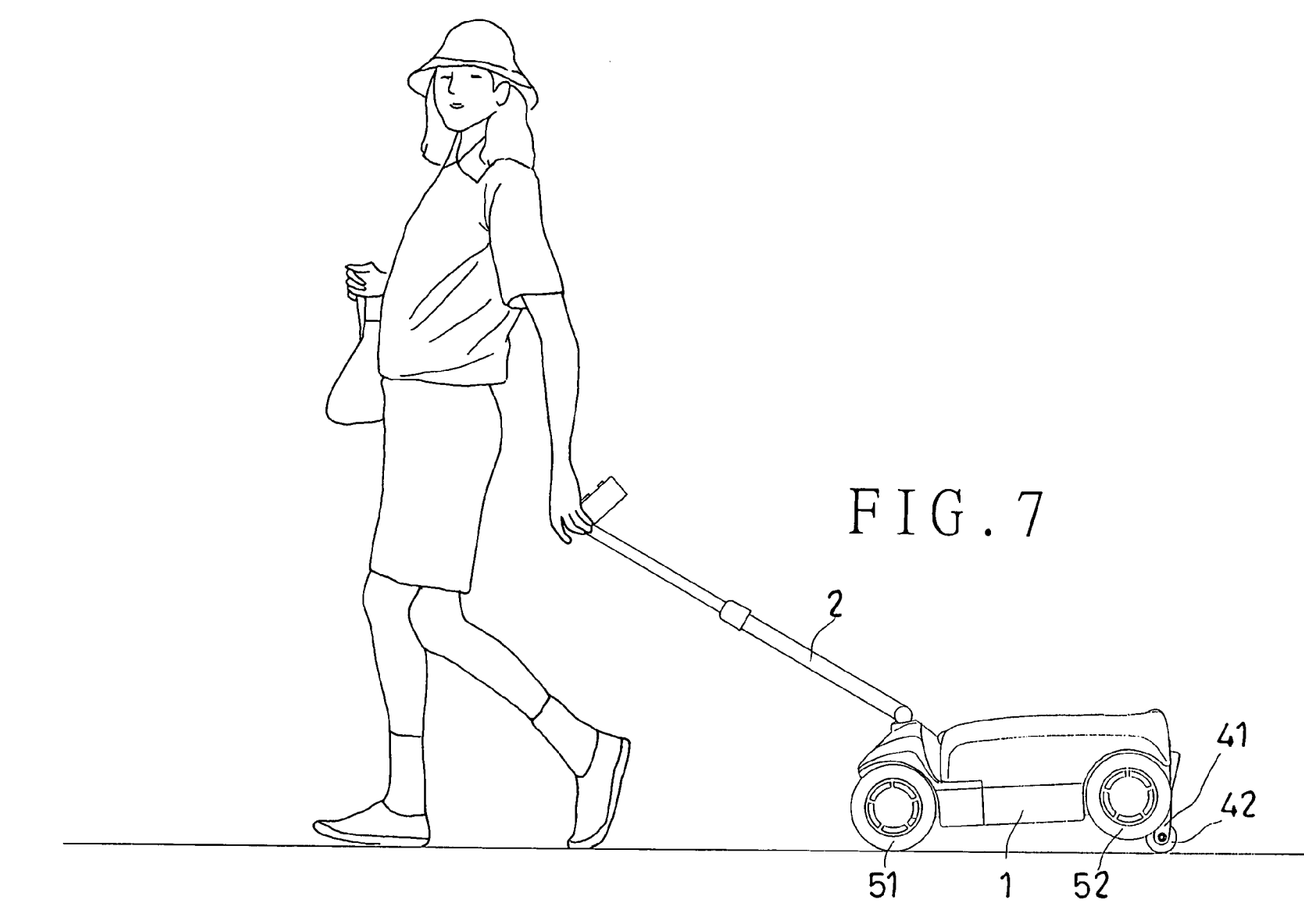
FIG. 7 is a view of the wheeled vehicle for individuals being dragged in the folded position.

Referring to FIG. 5, one can depress the seat 3, and pivot the steering mechanism 2 downwards to move the wheeled vehicle for individuals to a folded not-in-use position; the rear wheels 52 will be automatically immobilized to prevent the vehicle from sliding to cause accidents when the vehicle is turned off, i.e. not in use; when the seat 3 is being depressed, the supporting member 31 will pivot downwards relative to the main vehicle body 1, and in turn the first toothed portion 32 of the supporting member 3 will cause pivotal motion of the supporting rod 41 of the anti-tip wheel 4. Finally, the anti-tip wheel 4 will rest in a lower position than the rear wheels 52. Therefore, the rear wheels 52 are off the ground, and the vehicle in the folded configuration can be easily dragged to an intended place with the front wheels 51 and the anti-tip wheel 4 contacting the ground, as shown in FIG. 7.

Moreover, referring to FIG. 8, after the vehicle is folded to be easy to store and transport, the steering mechanism 2 will be held in the holding recess portion 33 of the seat 3; thus, the size of the folded vehicle can be further reduced.

From the above description, it can be seen that the wheeled vehicle for individuals of the present invention has the following advantages:

1. When the vehicle is in the expanded configuration, the anti-tip wheel will be in a higher position than the rear wheels. Therefore, when the vehicle is moving along a slope and tilting rearwards, the anti-tip wheel will contact the ground to prevent the vehicle from tilting rearwards excessively to overturn. Secondly, when the vehicle is in the folded configuration, the anti-tip wheel will be in a lower position than the rear wheels, which are currently in an immobilized state. Therefore, the rear wheels are off the ground, and the folded vehicle can be easily dragged with the help of the front wheels and the anti-tip wheel.

2. The co-moving mechanism of the vehicle of the present invention allows the anti-tip wheel to automatically move to an intended position when one is lifting the seat to expand the vehicle or depressing the seat to fold the vehicle. Therefore, the present invention is convenient to use, and can be rapidly moved between the expanded position and the folded one.

What is claimed is:

1. A device for allowing a wheeled vehicle for individuals to be dragged in a folded configuration, comprising:
   at least one front wheel joined on a main vehicle body;
   at least one rear wheel joined on the main vehicle body;
   an anti-tip wheel joined on a rear end of the main vehicle body; the anti-tip wheel being going to be below the rear wheel when the vehicle is in a folded not-in-use configuration; the anti-tip wheel being going to be in a higher position than the rear wheel when the vehicle is in an expanded in-use configuration;
   a seat joined on the main vehicle body; the seat including a supporting member pivoted on the vehicle body;
   a supporting rod pivoted on the main vehicle body; the anti-tip wheel being joined on the supporting rod; and
   a co-moving mechanism, which is provided between the supporting member of the seat and the supporting rod of the anti-tip wheel to allow motion of one of both the supporting rod and the supporting member to cause motion of other one of the supporting rod and the supporting member.

2. The device for allowing a wheeled vehicle for individuals to be dragged in a folded configuration as claimed in claim 1, wherein the co-moving mechanism includes a first toothed portion formed on the supporting member of the seat, and a second toothed portion formed on the supporting rod of the anti-tip wheel; the first and second toothed portions engaging each other.

3. The device for allowing a wheeled vehicle for individuals to be dragged in a folded configuration as claimed in claim 1 further comprising a steering mechanism pivoted on the front end of the main vehicle body; the seat having a holding recess portion; the steering mechanism being going to be at least partly received in the holding recess portion of the seat when the vehicle is in a folded configuration.

4. The device for allowing a wheeled vehicle for individuals to be dragged in a folded configuration as claimed in claim 1 further comprising a steering mechanism pivoted on a front end of the main vehicle body.

* * * * *